US007787655B1

(12) United States Patent
Cohen

(10) Patent No.: US 7,787,655 B1
(45) Date of Patent: Aug. 31, 2010

(54) SUB-PIXEL IMAGE REGISTRATION

(75) Inventor: Scott D. Cohen, Foster City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1751 days.

(21) Appl. No.: 10/376,734

(22) Filed: Feb. 27, 2003

(51) Int. Cl.
*G06K 9/00* (2006.01)
*G06K 9/62* (2006.01)

(52) U.S. Cl. .................. 382/103; 382/209; 382/216

(58) Field of Classification Search .................. 382/103, 382/209, 216, 276, 293, 294; 348/208.99
See application file for complete search history.

(56) References Cited

U.S. PATENT DOCUMENTS 5,548,326 A * 8/1996 Michael .................. 348/87
6,961,481 B2 * 11/2005 Lee et al. ................. 382/300

OTHER PUBLICATIONS

Lucas et al., "An Iterative Image Registration Technique with an Application to Stereo Vision", *Proceedings of Imaging Understanding Workshop*, pp. 121-130 (1981).
Shi et al., "Good Features to Track", *IEEE Conference on Computer Vision and Pattern Recognition (CVPR94)*, pp. 1-8 (Jun., 1994).
Tomasi et al., "Shape and Motion from Image Streams: a Factorization Method-Part 3, Detection and Tracking of Point Features", *School of Computer Science, Carnegie Mellon University*, pp. 1-32 (Apr. 1991).
Davis, J., "Mosaics of Scenes with Moving Objects," in IEEE Conference on Computer Vision and Pattern Recognition, pp. 354-360 (1998).
Kuglin and Hines. "The Phase Correlation Image Alignment Method," In IEEE Conference on Cybernetics and Society, Catalog No. 75 CHO 997-7 SMC, pp. 163-165 (1975).
Ziegler, M., "Hierarchical Motion Estimation Using the Phase Correlation Method in 140 MBIT/S HDTV-Coding," In Signal Processing of HDTV, II, L. Chiariglione (ed.), Copyright Elsevier Science Publishers B.V., pp. 131-137 (1990).

* cited by examiner

*Primary Examiner*—Brian Q Le
(74) *Attorney, Agent, or Firm*—Fish & Richardson P.C.

(57) ABSTRACT

An approach to sub-pixel image registration involves determining parameters of an objective function from pixel values of a template image and of a target image. This objective function is defined on a bounded continuous domain of relative displacements of the template image and the target image, which corresponds to sub-pixel registration locations. This objective function is directly optimized without necessarily evaluating spatially interpolated values of either the template image or the target image to achieve a global optimum of the objective function in the bounded domain that provides the sub-pixel registration location. The approach can be used for tracking a template in a sequence of video frames.

31 Claims, 5 Drawing Sheets

SUB-PIXEL IMAGE REGISTRATION

BACKGROUND

This invention relates to registration of digital images.

Procedures for registration of images are used in a variety of applications. In one application an area of interest is tracked in an image sequence, such as in a sequence of video frames, by locating the area in each successive frame. The tracking results are used, for example, to stabilize a hand-held video by translating each frame to stabilize the motion of the area of interest. In one such application, an initial area to track is identified in the first image of the sequence. This initial area forms a template that is located within the next image in the sequence using a registration procedure. The template is then optionally updated in appearance based on its location in that next image, and the process is repeated for each subsequent image in the sequence. The search region for the template in a given image is typically restricted to locations near the template's location in the previous image in the sequence.

For some applications of tracking, such as for video stabilization discussed above, a location estimate that is accurate only to the nearest pixel may result in poorer quality than if the registration of the template within each image is allowed to fall at a fractional pixel location. This is due, at least in part, to the aptitude of the human eye at detecting even very small changes in position.

Registration has other applications, such as adding special effects to video. To draw attention to particular moving feature in a video a marker, such as a synthetic arrow, can be drawn at a fixed offset from the feature in each of a sequence of video frames. A template of the feature is registered with each image in the video to determine where to draw the marker. As in the image stabilization application, a viewer may notice the small deviations or jitter of the marker particularly if the feature is moving in a regular motion such as along a straight line.

One prior method for sub-pixel accurate image registration makes use of an iterative approach to determine the registration of a template of a region of interest and an image. At each step in the iteration, this approach requires computing interpolated values at non-pixel locations in the image and computing approximations of spatial gradients at those locations. Based on the interpolated values and the spatial gradients, a next approximation of the registration location in the iteration is computed, for example, using a Newton-Raphson iteration. The iteration is then allowed to converge, or is terminated prior to convergence, to yield the sub-pixel registration location.

SUMMARY

In a general aspect, the invention features an approach to sub-pixel image registration in which a number of quantities are first computed from pixel values of a template image and a target image. These computed quantities are then directly processed to determine a globally optimal sub-pixel registration location within a continuous domain, for example, within a unit pixel region. These steps can be repeated for multiple domains within a single target image to determine a globally optimal location within those domains. These steps can also be repeated for multiple different target images, such as successive video frames, to track the motion of the template in the images.

In one aspect, in general, the invention features a method and apparatus, including computer program products stored on a medium or propagated in a signal, implementing techniques for registering a first image and a second image. A number of quantities are first computed from a first image and a second image according to a base registration location of the first image relative to the second image. These computed quantities are then processed to determine a globally optimal registration location within a continuous domain of registration locations relative to the base registration location.

In another aspect, in general, the invention features a method and apparatus, including computer program products stored on a medium or propagated in a signal, implementing techniques for tracking a template in a sequence of video frames. A number of quantities are first computed from the template and a first frame in the sequence of frames according to a base registration location of the template relative to the first frame. These computed quantities are then processed to determine a globally optimal registration location within a continuous domain of registration locations relative to the base registration location. These steps can be repeated for each frame in the video sequence, optionally updating the template based on the determined location of the template in at least some of the video frames.

Aspects of the invention can include one or more of the following features:

Computing the quantities includes determining parameters that define an objective function from the first image and from the second image. An argument of the objective function depends on a registration location relative to the base registration location, and the objective function is defined on at least some continuous domain of registration locations according to a spatial interpolation of the first image. The objective function is then optimized to determine a desired registration of the first image and the second image.

Determining the parameters of the objective function includes determining parameters characterizing an interpolated image defined by the first image, for example, by determining parameters of a bilinear interpolation of the first image.

The objective function is an analytic function of the registration location, and may be differentiable over at least some domains. Optimizing the objective function can include locating one or more critical points of the objective function, for example by finding roots of a polynomial.

The objective function is optimized within a bounded domain. For example, if the first image and the second image include pixels on a rectangular lattice, the bounded domain can correspond to a pixel area defined by the rectangular lattice.

The parameters of the objective function depend on a base registration location between the first image and the second image, which can correspond to a matching of pixel location of the first image and pixel locations of the second image. An argument of the objective function can then depend of a relative displacement relative to the base location.

The objective function is defined in terms of multiple separate objective functions, each for application in a different domain of relative displacement. The different domains of relative displacement can include multiple quadrants. Optimizing the objective function can include optimizing each of the multiple separate objective functions.

Once the objective function is specified, optimizing the objective function requires computation that is substantially independent of a size of the first image of a size of the second image.

The first image can be substantially larger than the second image, or the second image can be substantially larger than the first image.

The method further includes performing an exhaustive search in a domain of registration locations, including repeating the steps (a) and (b) for multiple separate continuous domains of registration locations.

Steps (a) and (b) are repeated to track a template in a sequence of video frames. Each of the sequence of video frames in turn can correspond to the first image, and the template corresponds to the second image. Alternatively, each of the sequence of video frames in turn can correspond to the second image, and the template corresponds to the first image.

The domain of relative displacements is determined according to motion of the template in the sequence of video frames.

Aspects of the invention can include one or more of the following advantages:

Accurate sub-pixel image registration can be computed efficiently.

Optimizing the objective function requires computation that is substantially independent of a size of the first image or a size of the second image.

Accurate tracking of a template in a video frame sequence can be performed computationally efficiently, and may be feasible for real-time video processing.

DESCRIPTION

Registration involves determining a best location of a template image within a second target image. For digital images, which are represented by pixel values on a discrete grid of pixel locations, the best registration location does not necessarily result in the pixel locations of the template matching the pixel locations of the target image. A registration location that is not necessarily constrained to be at such a correspondence of pixel locations is referred to as a sub-pixel registration location. At least conceptually, determining such a sub-pixel registration location involves interpolating either the template or the target image, or both.

The template image for registration may be determined from a variety of sources. In some applications, the template is a portion of a first image, and the target image is a second image. In other applications, the template may be formed in other ways, such as synthetically or by processing another image.

Figure 1A:
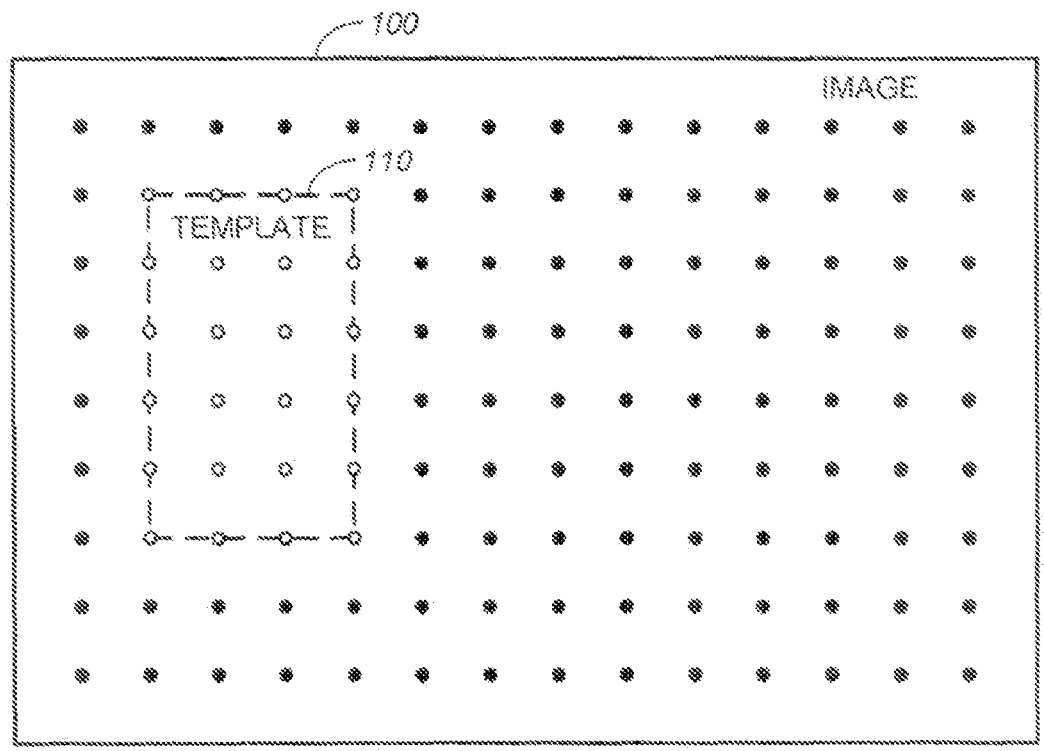
FIGS. 1A and 1B are diagrams of images. The image in FIG. 1A includes a template, which is located in the image in FIG. 1B.
Figure 1B:
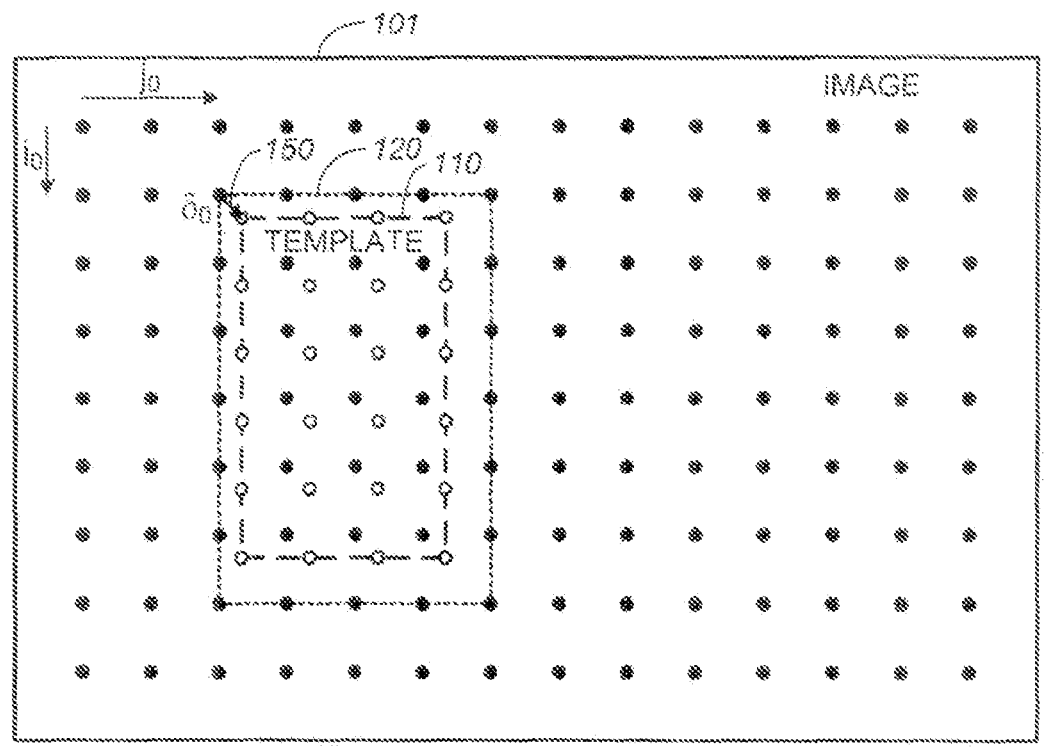

Referring to FIG. 1A, in an example of a registration procedure, an image 100 is represented by a set of pixel values each associated with a location on a square grid. The pixel values are each vector-valued, for example, each representing a point in a color space. A portion of the image 100 represents a template 110. This template is identified, for example, by a user who manually selects a region of interest in the image. Referring to FIG. 1B, a procedure is described below is to locate template 110 in a second image 101 by registering the pixel values of template 110 with image 101 at a location that may fall at fractional pixel offsets, that is, at a sub-pixel location.

The quality of a registration of template 110 at a particular location in image 101 is specified by an objective, or "error", function. The objective function is defined in terms of the values $S(x, y)$ of image 101, where x is the displacement from the left edge of the image and y is the displacement from the top of the image 101. At integral values of x and y the value of $S(x, y)$ equals a pixel value of the image. At fractional values of x or y the value of $S(x, y)$ is an interpolation of the pixel values according to an interpolation function. Template 110 is similarly defined in terms of image values $T(x, y)$, with the top left pixel value of the template corresponding to $T(0, 0)$. The template values $T(x, y)$ are defined on a domain of discrete pixel locations $(x, y) \in T$ which in the case of the rectangular template with width $W_T$ and height $H_T$ corresponds to the domain $0 \leq x < W_T$, $0 \leq y < H_T$. When evaluated for an argument corresponding to a registration location $(a_x, a_y)$, the object function has the form $$e(a_x, a_y) = \Sigma_{(x,y)\in T} \|T(x, y) - S(x+a_x, y+a_y)\|_2^2$$

where the square of the $L_2$ norm $\|\bullet\|_2$ is defined as $\|(v_1, \ldots, v_K)\|_2^2 \equiv \Sigma^K_{k=1} v_k^2$, and $(a_x, a_y)$ corresponds to the location of the top left pixel of template 110 in image 101. An optimal registration of the template on the image minimizes the objective function over possible registration locations.

The registration location of the template is expressed as a combination of a base pixel registration $(j_0, i_0)$, with integral values of $i_0$ and $j_0$, and a fractional relative pixel location $\delta = (\delta_x, \delta_y)$ from the base registration, such that $(a_x, a_y) = (j_0 + \delta_x, i_0 + \delta_y)$. For a particular base registration $(j_0, i_0)$, determining an optimal value of $\delta \in [0, 1] \times [0, 1]$ to minimize the objective function corresponds to finding an optimal registration of template 110 in an image region 120 of image 101. Image region 120 is one pixel larger in each dimension than template 110.

Figure 2:
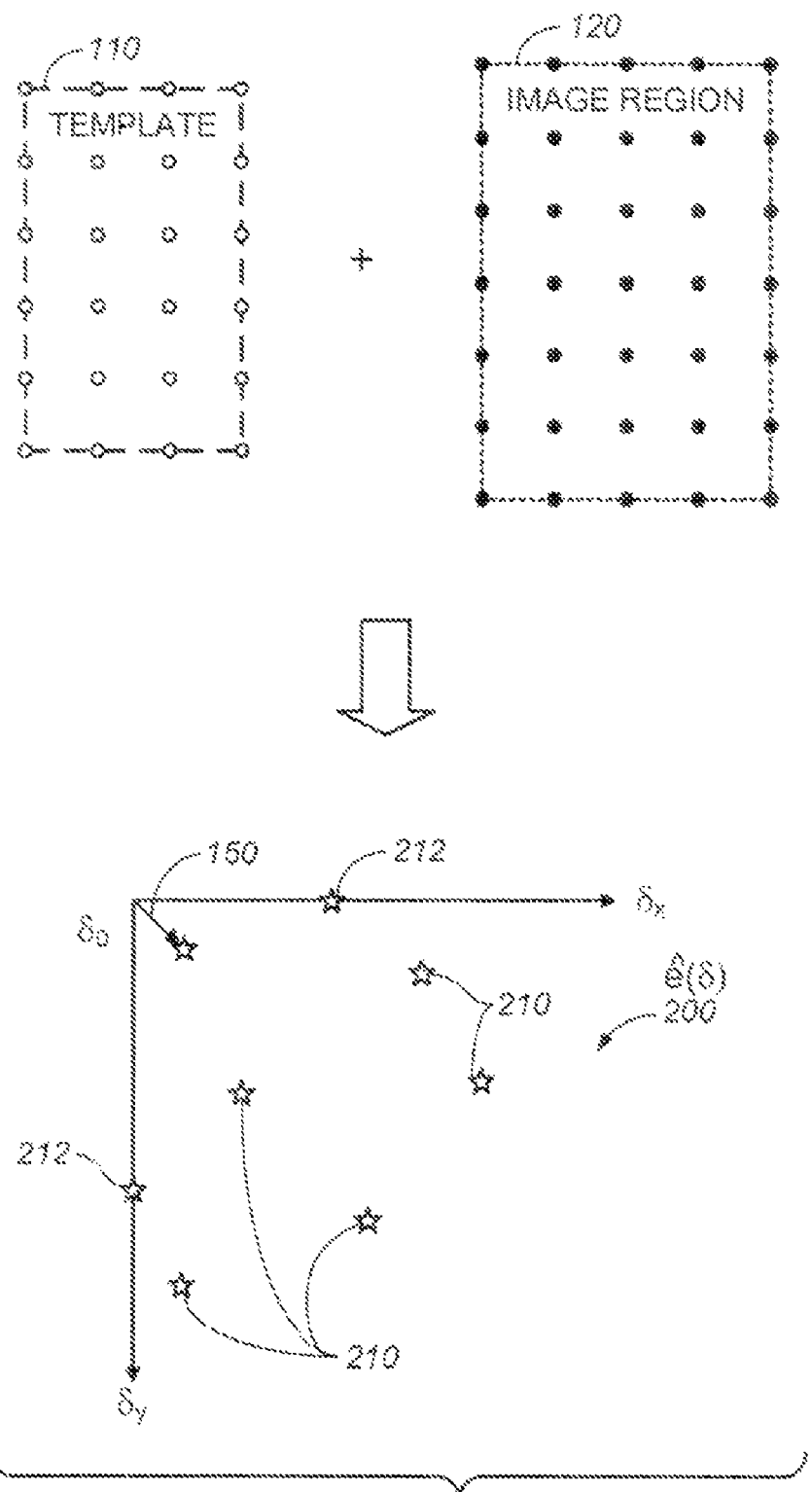
FIG. 2 is a diagram that illustrates a procedure for sub-pixel registration.

Referring to FIG. 2, an optimal value of $\delta \in [0, 1] \times [0, 1]$ is determined to minimize $\hat{e}(\delta_x, \delta_y) \equiv e(j_0 + \delta_x, i_0 + \delta_y)$. This optimization is carried out by first combining the pixel values of template 110 and image region 120 to determine parameter values of the objective function $\hat{e}(\bullet, \bullet)$. Once the parameters of the objective function are determined, the objective function is directly optimized over the possible fractional relative pixel locations $\delta = (\delta_x, \delta_y)$ using those parameter values without needing to use the pixel values of the template or the image region. That is, the template and image region are processed according to the base registration location $(j_0, i_0)$ to produce a set of quantities, the parameter values of the objective function. These quantities are then used to determine the optimal sub-pixel relative registration location. In the approach to optimizing $\hat{e}(\bullet, \bullet)$ described below, an iteration is used. Note however that for a particular base registration location it is not necessary to recompute values of the parameters of $\hat{e}(\bullet, \bullet)$ from the template or image region at each iteration of this direct optimization.

The functional form of $\hat{e}(\bullet, \bullet)$ depends on the form of the interpolation used to compute values of $S(x, y)$ at fractional values of x or y. For a bilinear interpolation approach, the value at $(x, y) = (j + \delta_x, i + \delta_y)$, for integral values of i and j and $0 \leq \delta_x, \delta_y \leq 1$, is computed as $$S(j+\delta_x, i+\delta_y) = (1-\delta_x)((1-\delta_y)S(j, i) + \delta_y S(j, i+1)) + \delta_x((1-\delta_y)S(j+1, i) + \delta_y S(j+1, i+1))$$

which can be rewritten by grouping terms as $$S(j+\delta_x, i+\delta_y)=S(i,j)+\delta_x(S(j+1,i)-S(j,i))+\delta_y(S(j,i+1)-S(j,i))+\delta_x\delta_y(S(j,i)+S(j+1,i+1)-S(j+1,i)-S(j,i+1))$$

When this form is substituted into $\hat{e}(\delta_x, \delta_y) \equiv e(j_0+\delta_x, i_0+\delta_y)$, the result is an analytic function of $\delta_x$ and $\delta_y$. More particularly, the objective function is a polynomial in the arguments $\delta_x$ and $\delta_y$, where the coefficients of the polynomial (i.e., parameters of the objective function) care computed from the pixel values of template 110 and image region 120. This polynomial is an exact representation of the objective function for registration locations in the pixel region $(x, y) \equiv [j_0, j_0+1] \times [i_0, i_0+1]$, or equivalently for relative pixel locations $(\delta_x, \delta_y) \equiv [0, 1] \times [0, 1]$. This polynomial form of the objective function can be represented in parametric form as $$\hat{e}(\delta_x, \delta_y) = \Sigma^2_{k=0} \Sigma^2_{l=0} c_{kl} \delta_y^k \delta_x^l$$

The parameters $c_{kl}$ are represented as $c_{22}=A$, $c_{12}=2B$, $c_{21}=2E$, $c_{02}=C$, $c_{11}=2D$, $c_{20}=G$, $c_{01}=2F$, $c_{10}=2H$, $c_{00}=I$, where the parameters pf the objective function, A through I, are computed from pixel values of template 110 and of image region 120 according to the pseudocode listing found at the end of this description.

Once the parameter values of the objective function are computed, the objective function is optimized to determine the optimal sub-pixel registration with the pixel region according to the procedures in the pseudocode listing.

Referring to FIG. 2, the process of determining an optimal sub-pixel registration is illustrated as first combining the pixel values in template 110 and in image region 120 to determine values of the parameters (A through I) of the objective function $\hat{e}(\delta)$. As is described below, the next step of the process is to locate critical points 210, 212 of $\hat{e}(\delta)$ in the domain $\delta \in [0, 1] \times [0, 1]$ as potential globally optimal points within the domain, and then to evaluate the objective function to determine the optimal point in the domain, in the illustrated example $\delta_0$ 150. That is, a globally optimal point within the domain must necessarily occur at one of the critical points. Each critical point may be a local maximum, a local minimum, or a saddle point.

If the global optimum of $\hat{e}(\delta_x, \delta_y)$ in the domain $\delta \in [0, 1] \times [0, 1]$ is in the interior region $(\delta_x, \delta_y) \in (0, 1) \times (0,1)$ it necessarily occurs at one of the critical point in the interior of the region. These critical points satisfy the two equations:

$$\frac{\partial \hat{e}}{\partial \delta_x} = 0 \text{ and } \frac{\partial \hat{e}}{\partial \delta_y} = 0.$$

One solution to this system of two equations is to substitute a solution for $\delta_y$ in terms of $\delta_x$ from the second equation into the first of the two equations, which yields a fifth degree polynomial equation $0=p(\delta_x)=\Sigma^5_{l=0} a_l \delta_x^l$. A numerical polynomial root finding method, such as Laguerre's method, is then used to solve for the roots $\delta^*_x$ of $p(\delta_x)$ to a desired precision. For each root of the polynomial, the corresponding value of $\delta^*_y$ is computed from $\delta^*_x$ according to the second equation. Note that the precision of the root determined by the root-finding method determines the precision of the location of the critical point and thereby the precision of the sub-pixel registration location.

The objective function $\hat{e}(\delta^*_x, \delta^*_y)$ is evaluated for all critical points in the unit pixel region $(\delta^*_x, \delta^*_y) \in (0, 1) \times (0, 1)$, if any, and the smallest value and corresponding location is recorded. Because $p(\delta_x)$ is a fifth degree polynomial, there are at most five roots. Furthermore, some or all of the roots correspond to locations $(\delta^*_x, \delta^*_y)$ outside the interior pixel region, and therefore less than five critical points typically lie within the unit pixel region. An alternative is to first determine which critical points are local minima, for example, using a test based on second derivatives, and only evaluate the objective function at the critical points that are local minima. In this version of the system, it is more efficient to evaluate the objective function at all the critical points than testing for local minima and evaluating the objective function at potentially fewer points.

An optimum value of $\hat{e}(\delta^*_x, \delta^*_y)$ may also occur at the boundary of the region $(\delta_x, \delta_y) \in [0, 1] \times [0, 1]$ (other than at the corners), that is, at a point at which either $\delta_x$ or $\delta_y$ is 0 or 1. The locations of these critical points are found by solving $\delta_x$ such that $$\left.\frac{\partial \hat{e}}{\partial \delta_x}\right|_{\delta_y=0,1} = 0 \text{ and } \delta_y \text{ such that} \left.\frac{\partial \hat{e}}{\partial \delta_y}\right|_{\delta_x=0,1} = 0.$$

Each of the four sides of the pixel region therefore has at most one critical point, and the value of the objective function is evaluated at each of these points, and the smallest value is recorded if it is smaller than the optimal value at an interior point. In addition, the objective function is evaluated at the four corners of the pixel region.

Figure 3:
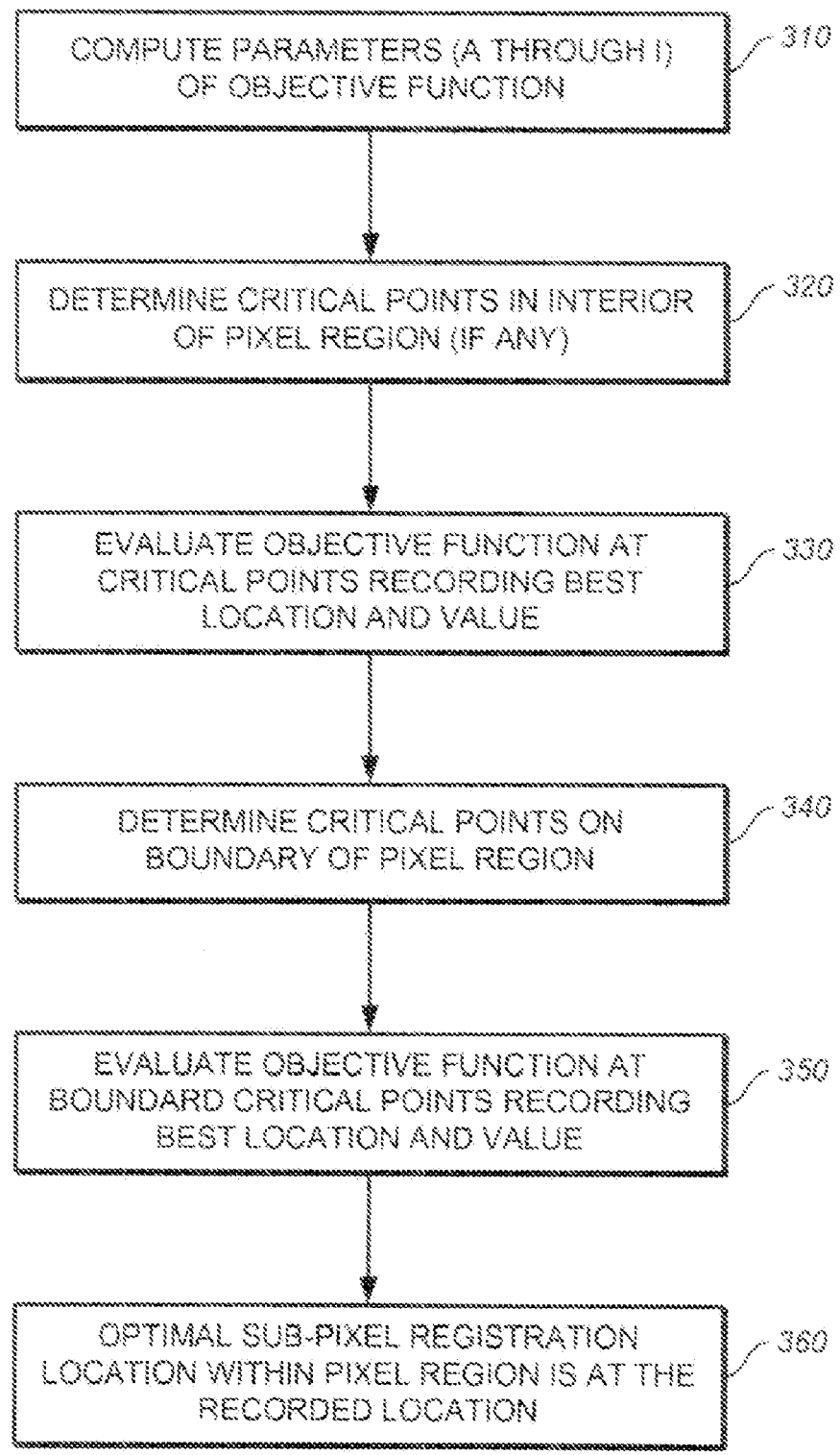
FIG. 3 is a flowchart of a sub-pixel registration procedure.

The procedure for finding the optimal sub-pixel registration location is summarized in to the flowchart shown in FIG. 3. For a particular base registration location $(j_0, i_0)$ and a defined template 110, the parameters of the objective function are computed based on the pixel values of template 110 and image region 120, which corresponds to the base registration location (step 310). Next, critical points 210 (see FIG. 2) are determined for the objective function (step 320) and the objective function is evaluated for the critical points in the interior of the pixel region, keeping track of the location and value of the best point (step 330). Critical points 212 on the boundary of the pixel region are similarly located (step 340) and the objective function is then evaluated at those boundary critical points, again keeping track of the location and value of the overall best point (step 350). Finally, the optimal sub-pixel registration location is determined from the optimal location in the pixel region, combined with the based registration location of image region 120 (step 360).

The procedure described above can be used for finding the best sub-pixel registration location can be repeatedly applied at each of a range of base registration locations, rather that only a single pixel region. That is, an exhaustive search approach is used to determine the best sub-pixel registration location within each of a number of unit pixel regions, and the best of these registration locations is retained as the global optimum over the entire region searched. For example, the search may be in the vicinity of the previous location of the template, or in the case of a motion-tracking application, may be in the vicinity of a predicted location based on a motion model.

Figure 4:
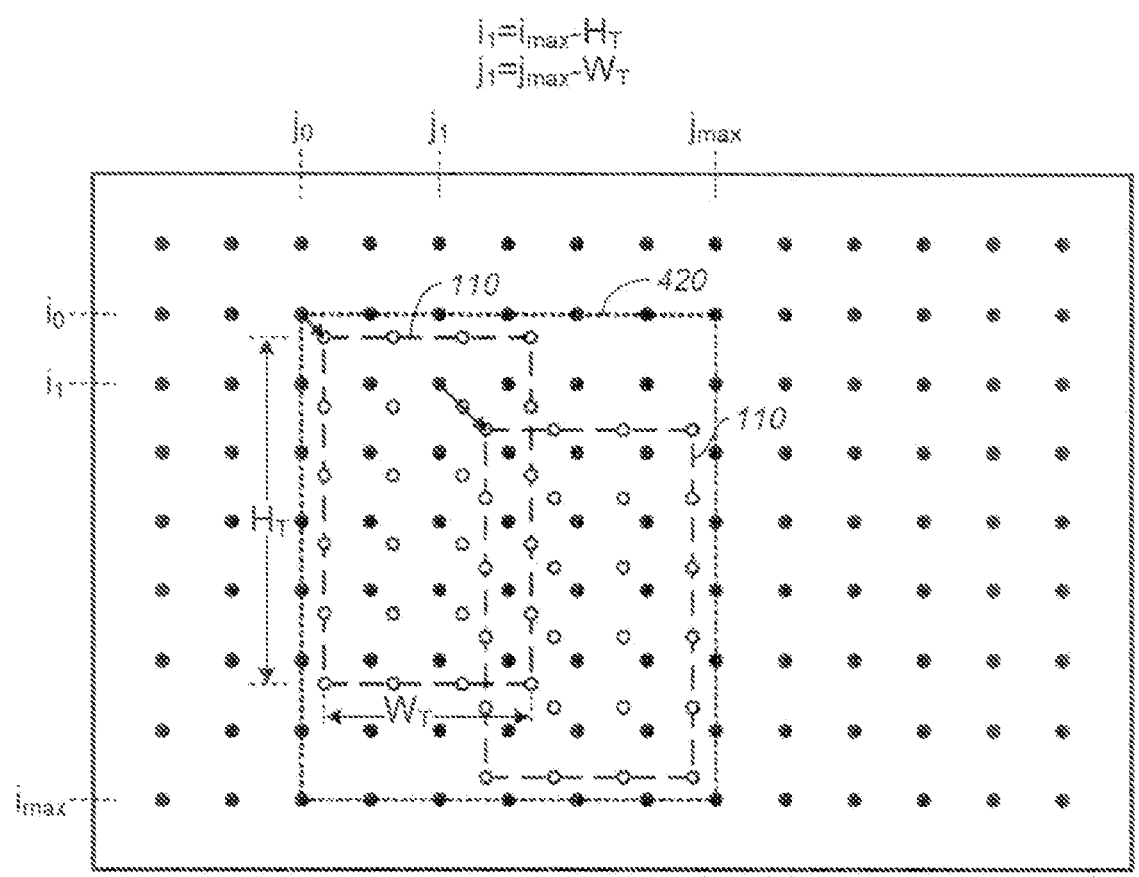
FIG. 4 is a diagram that illustrates an exhaustive search procedure.
Figure 5:
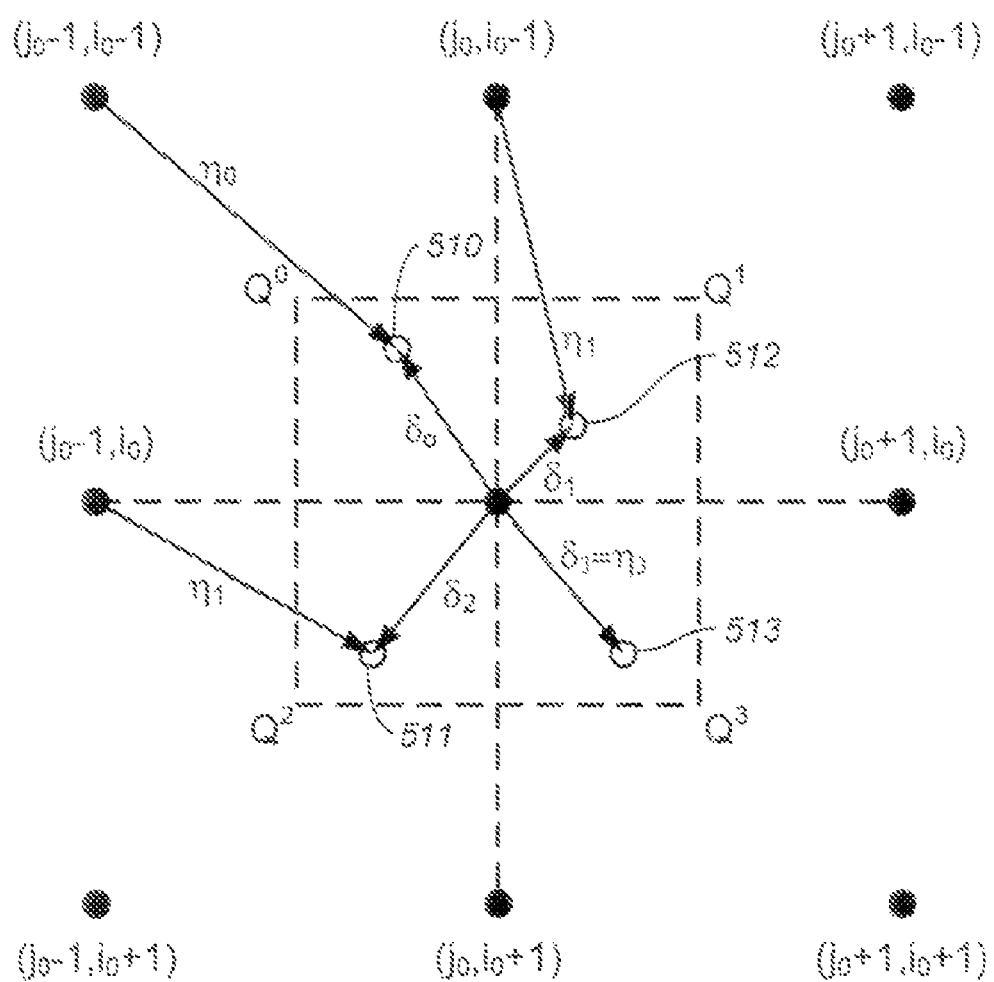
FIG. 5 is a diagram that illustrates a procedure for determining a ±½ pixel registration procedure.

Referring to FIG. 4, template 110, which has width $W_T$ and height $H_T$, is to be optimally registered so that it falls in the region $(x, y) \in [j_0, j_{max}] \times [i_0, i_{max}]$. The sub-pixel registration procedure is repeated for each (integral) base registration location in the range $[j_0 \ldots j_{max}-H_T] \times [i_0 \ldots i_{max}-W_T]$. At each base location, new parameters for the objective function are calculated and the optimal value in that pixel region is determined according to the procedure described above.

The current best value of the objective function is kept track of during the exhaustive search yielding an optimal value after the exhaustive search is completed.

In a variant of the exhaustive search, before each base registration location is considered, a lower bound on the objective function is computed, and if this lower bound exceeds the current best value, that base registration location is not considered further.

The lower bound for the objective function for a base registration location $(i_0, j_0)$ is computed as follows. Define the quantities:

$$S_k^{min}(j_0, i_0) = \min_{\delta_x, \delta_y \in \{0,1\}} S_k(j_0+\delta_x, i_0+\delta_y), \text{ and}$$

$$S_k^{max}(j_0, i_0) = \max_{\delta_x, \delta_y \in \{0,1\}} S_k(j_0+\delta_x, i_0+\delta_y)$$

where $S_k(x, y)$ is the $k^{th}$ component of the vector pixel value at location $(x, y)$. The lower bound $L(j_0, i_0) \leq \hat{e}(\delta_x, \delta_y) = e(j_0+\delta_x, i_0+\delta_y)$ over $(\delta_x, \delta_y) \in [0, 1] \times [0, 1]$ is then computed as:

$$L(j_0, i_0) = \sum_{(j-j_0, i-i_0) \in T} \sum_{k=1}^{K} \begin{cases} (S_k^{min}(j, i) - T_k(j-j_0, i-i_0))^2 & \text{if } S_k^{min}(j, i) > T_k(j-j_0, i-i_0) \\ (S_k^{max}(j, i) - T_k(j-j_0, i-i_0))^2 & \text{if } S_k^{max}(j, i) \leq T_k(j-j_0, i-i_0) \end{cases}$$

In another variant of the exhaustive search approach, part of the computation of the parameters of the objective function is re-used as the base registration location is incremented by one pixel. In particular, some of the quantities used to determine the parameters of the objective function (i.e., the A-G terms) are incrementally updated as the image region is moved one pixel. An incremental update of terms A, B, C, E and G is performed in $O(W_T+H_T)$ time, while an incremental update of terms D, F, H and I is performed in $O(W_T H_T)$ time.

Another use of the sub-pixel registration procedure described above is for finding an optimal sub-pixel registration within ±½ pixel of an integer base registration location. That is, the goal is to find an optimal sub-pixel registration $(\delta_x, \delta_y) \in [-½, ½] \times [-½, ½]$ to minimize the objective function $\hat{e}(\delta_x, \delta_y)$. Note however, that the polynomial form of $\hat{e}(\delta_x, \delta_y)$ derived above is valid only for $(\delta_x, \delta_y) \in [0, 1] \times [0, 1]$. The approach to finding the optimal ±½ pixel registration is to divide the domain $[-½, ½] \times [-½, ½]$ into four quadrants:

$$Q^0 = [-½, 0] \times [-½, 0],$$

$$Q^1 = [0, ½] \times [-½, 0],$$

$$Q^2 = [-½, 0] \times [0, ½], \text{ and}$$

$$Q^3 = [0, ½] \times [0, ½].$$

Within each of the four quadrants, the objective function has a different form. Therefore, the problem for finding an optimal relative registration location $(\delta_x, \delta_y) \in [-½, ½] \times [-½, ½]$ relative to a base registration $(j_0, i_0)$ is solved in four parts, each associated with a different quarter-pixel domain:

$\eta_0 = (\eta_x^0, \eta_y^0) \in [½, 1] \times [½, 1]$ relative to a base registration $(j_0-1, i_0-1)$, $\eta_1 = (\eta_x^1, \eta_y^1) \in [0, ½] \times [½, 1]$ relative to a base registration $(j_0, i_0-1)$, $\eta_2 = (\eta_x^2, \eta_y^2) \in [½, 1] \times [0, ½]$ relative to a base registration $(j_0-1, i_0)$, and $\eta_3 = (\eta_x^3, \eta_y^3) \in [0, ½] \times [0, ½]$ relative to a base registration $(j_0, i_0)$ Each of these four parts is solved using the procedure described above, with the exception that only critical points within the restricted quarter-pixel domains identified above are considered.

The optimal value of the objective function found by the procedure for each part is compared, and the value of the relative registration location $\delta = (\delta_x, \delta_y)$ is determined according to the quadrant in which the optimal value is found: $\delta = \eta_0 - (1, 1)$ in $Q^0$, $\delta = \eta_1 - (0, 1)$ in $Q^1$, $\delta = \eta_2 - (1, 0)$ in $Q^2$, and $\delta = \eta_3$ in $Q^3$.

The procedures and algorithms described above can be implemented in software or hardware, or a combination of both (e.g., programmable logic arrays). Unless otherwise specified, the procedures and algorithms are not inherently related to any particular computer or other apparatus. In particular, various general purpose machines may be used with programs written according to the general approach described above, or it may be more convenient to construct more specialized devices (e.g., integrated circuits) to perform particular functions. The procedures and algorithms can therefore be implemented in one or more computer programs executing on one or more programmed or programmable computer systems (which may be of various architectures such as distributed or client/server) each having at least one processor, at least one data storage system (including volatile and non-volatile memory and/or storage elements), at least one input device or port, and at least one output device or port. Each program can be implemented in any of a variety of computer languages (including machine, assembly, or high level procedural, logical, or object oriented programming languages) to communicate with a computer system. In any case, the language may be a compiled or interpreted language. Each such computer program is preferably stored on or downloaded to a storage media or device (e.g., solid state memory or media, or magnetic or optical media) readable by a general or special purpose programmable computer, or propagated in a signal over a medium (e.g., an optical, electrical, or electro-magnetic medium), for configuring and operating the computer when the storage media or device is read by the computer system to perform the procedures and algorithms described above.

In one version of the registration approaches described above, the procedures are implemented in software, which is stored or distributed on a computer-readable medium such as an optical or magnetic disk and executed on a general purpose computer. For instance, the software includes machine instructions for an Intel Pentium processor for execution as a program under a Microsoft Windows operating system. In one specific version, the approach is implemented as a component of the Adobe After Effects software product.

In an alternative implementation, the registration approach is implemented in a special-purpose device processing video frames, including tracking areas of interest in the frames according to the approaches described above.

The registration approaches described above can be used in a variety of applications. In a motion tracking application, a template is located in (i.e., registered with) each of a series of video frames. The template can be identified in a number of different ways. For example, a user may identify a region of interest in one of the frames, for example, in a frame at an end of the sequence, or in a frame within the sequence. The template is then located in subsequent (or previous) frames in the sequence. The application can predict an expected location of the template, thereby allowing the search domain to be restricted to relatively likely locations of the template. The template may also be identified from another source of images, such as from a library of images, rather than from within the sequence of images itself. The template may be updated in appearance or shape after it is located in an image, for example, at each frame in the sequence of images. This motion tracking can then be used to stabilize the video, or to add special effects at locations relative to the tracked template in the frames.

Alternative versions of the approach differ from the approaches described above in one of more of the following ways.

The template region is not necessarily rectangular. For example, another regular shape (e.g., circular, oval) can be used, or an irregular region that may be drawn by a user or automatically determined using an image processing algorithm, such as a edge detection algorithm can be used.

Other interpolation approaches than bilinear interpolation can be used. For example, a bicubic interpolation approach may be used. In a bicubic interpolation approach, the interpolated values in a pixel region depend on the sixteen pixel values that surround it (as opposed to the four pixel values in the bilinear case). The form of the objective function depends on the form of the interpolation function. Using a bicubic interpolation form, the objective function remains exactly represented by a polynomial within the unit pixel region. The objective function is therefore differentiable within the unit pixel region of sub-pixel relative deviations, and therefore the approach to locating an optimal relative deviation by locating critical points and evaluating the objective function at those critical points can be used.

Other interpolation forms can also be used, and these forms may not necessarily yield polynomial objective functions. Nevertheless, the objective function may still be optimized to determine the relative deviation of the registration location. For many forms of interpolation, the objective function is differentiable, or piecewise differentiable over a number of domains. Alternative optimization approaches can also be used, including two-dimensional iterative gradient approaches, successive approximation, and various other numerical techniques, which may be applicable even if the objective function is not differentiable. Furthermore, alternative error functions, for example, using different norms or using spatially-weighted norms, can also be used.

The approach is applicable to various forms of pixel values, which can be scalar or vector, such a luminance, chrominance, or various linear or non-linear functions of raw pixel values. Also, alternative objective functions can be used, for example, using different norms to define the objective function.

In the formulation above, the image in which the template is to be located is interpolated to determine the value of the objective function. Alternatively, the template can be interpolated and the error function can be represented as a sum over image pixels rather than over template pixels. Still another alternative is to interpolate both the template and the image, in which case the objective function can be represented as an integral over a continuous template domain.

The approach to locating an optimum of the objective function within a unit pixel region can be extended to allow extrapolation outside the unit pixel region. Within the unit pixel region, the parameterized objective function is an exact representation of the objective function given the interpolation approach. Outside the unit pixel region of relative registration locations, the parameterized objective function is not necessarily exact but may form a useful approximation of the true objective function. Therefore, if the parameterized objective function yields an optimum in pixel region with a different integral base registration, an alternative is to consider that base registration in an iterative approach as an alternative, or to complement, an exhaustive search approach.

The approach to locating an optimum of the objective function can also be combined with other approaches. For example, a conventional iterative approach may be used to locate a coarse registration location, and then an exhaustive search in the vicinity of that coarse registration location, or a single optimization relative to that coarse registration, can be carried out using the approach described above.

PSEUDOCODE LISTINGS

Computing Parameters of the Objective Function $\hat{e}(\delta_x, \delta_y)$

Compute parameters from template T and image region at base pixel registration $(j_0, i_0)$ Begin For each $(j-j_0, i-i_0) \in T$ compute vector quantities $$v_{ij00} = T(j-j_0, i-i_0) - S(j, i)$$

$$v_{ij01} = S(j, i) - S(j, i+1)$$

$$v_{ij10} = S(j, i) - S(j+1, i)$$

$$v_{ij11} = S(j, i+1) + S(j+1, i) - S(j, i) - S(j+1, i+1)$$

Compute scalar quantities $$A = \Sigma \|v_{ij11}\|_2^2$$

$$B = \Sigma <v_{ij10}, v_{ij11}>$$

$$C = \Sigma \|v_{ij10}\|_2^2$$

$$D = \Sigma (<v_{ij00}, v_{ij11}> + <v_{ij01}, v_{ij10}>)$$

$$E = \Sigma <v_{ij01}, v_{ij11}>$$

$$F = \Sigma <v_{ij00}, v_{ij10}>$$

$$G = \Sigma \|v_{ij01}\|_2^2$$

$$H = \Sigma <v_{ij00}, v_{ij01}>$$

$$I = \Sigma \|v_{ij00}\|_2^2$$

where each of the summations is over the domain $(j-j_0, i-i_0) \in T$, the square of the $L_2$ norm $\|\cdot\|_2$ is defined as $\|(v_1, \ldots, v_K)\|_2^2 \equiv \Sigma^K_{k=1} v_k^2$ and the ordinary inner product is defined as $<(v_1, \ldots, v_K), (w_1, \ldots, w_K)> = \Sigma^K_{k=1} v_k w_k$ Compute $c_{22}=A$, $c_{12}=2B$, $c_{21}=2E$, $c_{02}=C$, $c_{11}=2D$, $c_{20}=G$, $c_{01}=2F$, $c_{10}=2H$, $c_{00}=I$ Define $\hat{e}(\delta_x, \delta_y) = \Sigma^2_{k=0} \Sigma^2_{l=0} c_{kl} \delta_y^k \delta_x^l$ End Optimizing $\hat{e}(\delta_x, \delta_y)$ Over a Pixel Region Optimize $\hat{e}(\delta_x, \delta_y)$ over $(\delta_x, \delta_y) \in [0, 1] \times [0, 1]$

```
Begin
/* consider corners of pixel region */ val* = min_{j,i∈{0,1}} ê(j, i)

(δ*_x, δ*_y) = arg min_{j,i∈{0,1}} ê(j, i)

/* consider interior critical points by solving
```

$$\frac{1}{2}\frac{\partial \hat{e}}{\partial \delta_x} = A\delta_x\delta_y^2 + 2B\delta_x\delta_y + C\delta_x + D\delta_y + E\delta_y^2 + F = 0$$

$$\frac{1}{2}\frac{\partial \hat{e}}{\partial \delta_y} = A\delta_x^2\delta_y + 2E\delta_x\delta_y + D\delta_x + G\delta_y + B\delta_x^2 + H = 0$$

Compute $a_5 = A^2C - AB^2$ $a_4 = A^2F + 4ACE - 3B^2E - ABD$ $a_3 = 2(2CE^2 + 2AEF + ACG - B^2G - 2BDE)$ $a_2 = 4E^2F + 4CEG + 2AFG + ADH - D^2E - 3BDG - 2BEH$ $a_1 = CG^2 + AH^2 + 4EFG - D^2G - 2BGH$ $a_0 = FG^2 + EH^2 - DGH$

```
Find roots of p(δ_x) = Σ^5_{l=0} a_l δ_x^l
For each root δ_x
    Compute δ_y = -(Bδ_x^2 + Dδ_x + H)/(Aδ_x^2 + 2Eδ_x + G)
    If (δ_x, δ_y) ∈ (0, 1)×(0, 1) then
        Evaluate val = ê(δ_x, δ_y)
        If val < val* then
            val* = val
            (δ*_x, δ*_y) = (δ_x, δ_y)
        Endif
    Endif
/* consider (non-corner) edges of pixel region by solving
```

$$\left.\frac{\partial \hat{e}}{\partial \delta_x}\right|_{\delta_y=0,1} = 0 \text{ and } \left.\frac{\partial \hat{e}}{\partial \delta_y}\right|_{\delta_x=0,1} = 0$$

Compute $\delta_x^0 = 0,\ \delta_y^0 = -H/G$ $\delta_x^1 = -F/C,\ \delta_y^1 = 0$ $\delta_x^2 = 1,\ \delta_y^2 = -(D+B+H)/(A+2E+G)$ $\delta_x^3 = -(D+E+F)/(A+2B+C),\ \delta_y^3 = 1$

```
For each (δ_x^k, δ_y^k), k=0 ... 3
    If 0 ≤ δ_x^k, δ_y^k ≤ 1 then
        Evaluate val = ê(δ_x^k, δ_y^k)
        If val < val* then
            val* = val
            (δ*_x, δ*_y) = (δ_x^k, δ_y^k)
        Endif
    Endif
Return (δ*_x, δ*_y)
End
```

What is claimed is:

1. A method for registering a first image and a second image the method comprising:
using a programmable computer system having a processor to perform operations comprising:
(a) computing quantities from a combination of the first image and the second image at a base registration location of the first image relative to the second image,
wherein computing the quantities includes determining parameters that define an objective function from the first image and from the second image, wherein an argument of the objective function depends on a registration location relative to the base registration location, the objective function is defined on at least some continuous domain of registration locations according to a spatial interpolation of the first image, the objective function is an analytic function of the registration location, and the objective function is differentiable over at least some domain; and
(b) processing the computed quantities to determine a globally optimal registration location within a continuous domain of registration locations relative to the base registration location,
wherein processing the computed quantities includes optimizing the objective function based on the determined parameters to determine a desired registration of the first image and the second image, wherein optimizing the objective function includes locating one or more critical points of the objective function, and wherein locating the critical points includes finding roots of a polynomial.

2. The method of claim 1 wherein determining the parameters of the objective function includes determining parameters characterizing an interpolated image defined by the first image.

3. The method of claim 2 wherein determining the parameters characterizing the interpolated image includes determining parameters of a bilinear interpolation of the first image.

4. The method of claim 1 wherein optimizing the objective function includes evaluating the objective function at at least some of the located critical points.

5. The method of claim 1 wherein the first image and the second image include pixels on a rectangular lattice, and the continuous domain includes a pixel area defined by the rectangular lattice.

6. The method of claim 5 wherein the base registration location corresponds to a matching of pixel locations of the first image and pixel locations of the second image.

7. The method of claim 1 wherein the objective function includes multiple separate objective functions, each for application in a different domain of registration locations.

8. The method of claim 7 wherein the different domains of relative displacement include multiple quadrants defined by pixel locations of the first image.

9. The method of claim 7 wherein the step of optimizing the objective function includes optimizing each of the multiple separate objective functions.

10. The method of claim 1 wherein processing the computed quantities requires computation that is substantially independent of a size of the first image or a size of the second image.

11. The method of claim 1 wherein the first image is substantially larger than the second image.

12. The method of claim 1 wherein the second image is substantially larger than the first image.

13. The method of claim 1 further comprising performing an exhaustive search in a domain of registration locations, including repeating the steps (a) and (b) for multiple separate continuous domains of registration locations.

14. The method of claim 1 further comprising repeating the steps (a) and (b) to track a template in a sequence of video frames.

15. The method of claim 14 wherein each of the sequence of video frames in turn corresponds to the first image, and the template corresponds to the second image.

16. The method of claim 14 wherein each of the sequence of video frames in turn corresponds to the second image, and the template corresponds to the first image.

17. A method for tracking a template in a sequence of video frames the method comprising:
using a programmable computer system having a processor to perform operations comprising:
(a) computing quantities from a combination of the template and a first frame in the sequence of frames at a base registration location of the template relative to the first frame,
wherein computing the quantities includes determining parameters that define an objective function from the template and from the first frame, wherein an argument of the objective function depends on a registration location relative to the base registration location, the objective function is defined on at least some continuous domain of registration locations according to a spatial interpolation of the template, the objective function is an analytic function of the registration location, and the objective function is differentiable over at least some domain; and
(b) processing the computed quantities to determine a globally optimal registration location within a continuous domain of registration locations relative to the base registration location,
wherein processing the computed quantities includes optimizing the objective function based on the determined parameters to determine a desired registration of the template and the first frame, wherein optimizing the objective function includes locating one or more critical points of the objective function, and wherein locating the critical points includes finding roots of a polynomial.

18. The method of claim 17 wherein steps (a) and (b) are repeated for each frame in the video sequence.

19. The method of claim 18 further comprising updating the template based on the determined location of the template in at least some of the video frames.

20. The method of claim 18 further comprising for at least some frames in the sequence performing an exhaustive search in a domain of relative displacements, including repeating the steps (a) and (b) for multiple different base registration locations.

21. The method of claim 20 further comprising determining the domain of relative displacements according to motion of the template in the sequence of video frames.

22. A computer program product on a computer-readable medium for registering a first image and a second image, the product comprising instructions operable to cause a computer to:
(a) compute quantities from a combination of a first image and a second image at a base registration location of the first image relative to the second image,
wherein computing the quantities includes determining parameters that define an objective function from the first image and from the second image, wherein an argument of the objective function depends on a registration location relative to the base registration location, the objective function is defined on at least some continuous domain of registration locations according to a spatial interpolation of the first image, the objective function is an analytic function of the registration location, and the objective function is differentiable over at least some domain; and
(b) process the computed quantities to determine a globally optimal registration location within a continuous domain of registration locations relative to the base registration location,
wherein processing the computed quantities includes optimizing the objective function based on the determined parameters to determine a desired registration of the first image and the second image, wherein optimizing the objective function includes locating one or more critical points of the objective function, and wherein locating the critical points includes finding roots of a polynomial.

23. The product of claim 22 wherein the instructions further cause the computer to perform an exhaustive search in a domain of relative displacements by repeating the steps of (a) determining the parameters of the objective function and (b) optimizing the objective function for multiple different reference displacements of the first image and the second image.

24. The product of claim 22 wherein the instructions further cause the computer to repeat the steps (a) and (b) to track a template in a sequence of video frames.

25. A method for motion tracking, the method comprising, for each of multiple video frames in a sequence of video frames:
using a programmable computer system having a processor to perform operations comprising:
determining one or more base pixel registration locations from a domain of possible registration locations of a template and the video frame;
for each of the one or more base pixel registration locations
computing a fixed number of quantities from pixel values of the template and the video frame at the base pixel registration location,
wherein computing the fixed number of quantities includes determining parameters that define an objective function from the template and from the video image, wherein an argument of the objective function depends on a registration location relative to the base registration location, the objective function is defined on at least some continuous domain of registration locations according to a spatial interpolation of the template image, the objective function is an analytic function of the registration location, and the objective function is differentiable over at least some domain,
processing the computed quantities to determine a globally optimal registration location within a continuous domain of registration locations relative to the base pixel registration location according to a spatial interpolation of one or both of the template and the video frame,
wherein processing the computed quantities includes optimizing the objective function based on the determined parameters to determine a desired registration of the template image and the video image, wherein optimizing the objective function includes locating one or more critical points of the objective function, and wherein locating the critical points includes finding roots of a polynomial; and
determining a sub-pixel location of the template within the domain of possible registration locations from the determined globally optimal registration locations relative to the one or more base pixel registration locations.

26. A programmable computer system comprising:

a processor, wherein the processor is configured to perform operations comprising:

(a) computing quantities from a combination of a first image and a second image at a base registration location of the first image relative to the second image, wherein computing the quantities includes determining parameters that define an objective function from the first image and from the second image, wherein an argument of the objective function depends on a registration location relative to the base registration location, the objective function is defined on at least some continuous domain of registration locations according to a spatial interpolation of the first image, the objective function is an analytic function of the registration location, and the objective function is differentiable over at least some domain; and (b) processing the computed quantities to determine a globally optimal registration location within a continuous domain of registration locations relative to the base registration location, wherein processing the computed quantities includes optimizing the objective function based on the determined parameters to determine a desired registration of the first image and the second image, wherein optimizing the objective function includes locating one or more critical points of the objective function, and wherein locating the critical points includes finding roots of a polynomial.

27. The programmable computer system of claim 26 wherein the processor is configured to perform operations further comprising performing an exhaustive search in a domain of registration locations, including repeating the steps (a) and (b) for multiple separate continuous domains of registration locations.

28. The programmable computer system of claim 26 wherein the processor is configured to perform operations further comprising repeating the steps (a) and (b) to track a template in a sequence of video frames.

29. A computer storage medium, encoded with a computer program, the program comprising instructions that when executed by a computer system cause the computer system to perform operations comprising:

(a) computing quantities from a combination of a first image and a second image at a base registration location of the first image relative to the second image, wherein computing the quantities includes determining parameters that define an objective function from the first image and from the second image, wherein an argument of the objective function depends on a registration location relative to the base registration location, the objective function is defined on at least some continuous domain of registration locations according to a spatial interpolation of the first image, the objective function is an analytic function of the registration location, and the objective function is differentiable over at least some domain; and (b) processing the computed quantities to determine a globally optimal registration location within a continuous domain of registration locations relative to the base registration location, wherein processing the computed quantities includes optimizing the objective function based on the determined parameters to determine a desired registration of the first image and the second image, wherein optimizing the objective function includes locating one or more critical points of the objective function, and wherein locating the critical points includes finding roots of a polynomial.

30. The computer storage medium of claim 29 further comprising instructions that when executed by the computer system cause the computer system to perform operations comprising performing an exhaustive search in a domain of registration locations, including repeating the steps (a) and (b) for multiple separate continuous domains of registration locations.

31. The computer storage medium of claim 29 further comprising instructions that when executed by the computer system cause the computer system to perform operations comprising repeating the steps (a) and (b) to track a template in a sequence of video frames.

* * * * *